Jan. 25, 1955

E. J. FLYNN ET AL 2,700,212

ELECTRICAL CONDUCTOR

Filed Oct. 15, 1948

Fig.1.

METALLIC CORE
e. g., COPPER 1
2
3

Inventors:
Edward J. Flynn,
Gerald W. Young,
by [signature]
Their Attorney.

United States Patent Office 2,700,212
Patented Jan. 25, 1955

2,700,212

ELECTRICAL CONDUCTOR

Edward J. Flynn and Gerald W. Young, Schenectady, N. Y., assignors to General Electric Company, a corporation of New York Application October 15, 1948, Serial No. 54,636

3 Claims. (Cl. 29—195)

This invention relates to electrical conductors and particularly is concerned with electrical conductors comprising (1) a metallic core, the outer surface of which is an aluminum-type surface, i. e., one selected from the class consisting of aluminum, aluminum oxide and aluminum fluoride, and (2) an outer sheath comprising polymeric chlorotrifluoroethylene super-imposed directly on the aforementioned core.

One of the objects of this invention is to prepare an electrical conductor having an outside insulation of polymeric chlorotrifluoroethylene which will adhere closely to the metallic core and will not crack or peel from the said core after the electrical conductor has been subjected to elevated temperatures.

Another object of this invention is to make a copper electrical conductor having an outer sheath of heat resistant and chemical resistant polymeric chlorotrifluoroethylene which will not crack or peel from the copper core when the conductor is heated at the elevated temperatures necessary to obtain smooth coatings of the aforementioned polymeric insulating material.

An additional object of this invention is to obtain an insulated electrical conductor comprising a metallic core and an outer sheath of polymeric chlorotrifluoroethylene which exhibits improved abrasion resistance.

Further objects of this invention will become more apparent from the disclosures thereof which follow.

The novel features of my invention are set forth in the appended claims. The invention itself, however, will be understood more readily from the following disclosures when considered in connection with the accompanying drawing in which the three figures are perspective views of insulated electrical conductors embodying the invention. In Fig. 1 is shown a metallic core 1, for example, copper, surrounding which is a thin adherent coating of aluminum 2, and superimposed directly on the aluminum coating is a synthetic resinous insulation material comprising polymeric chlorotrifluoroethylene 3. In Fig. 2 the electrical core 4 comprises essentially aluminum surrounding which is a coating of polymeric chlorotrifluoroethylene 5. Fig. 3 shows a copper core 6 having a thin adherent film of aluminum 7 which in turn contains a thin film of aluminum oxide 8. Polymeric chlorotrifluoroethylene insulation 9 covers the aluminum oxide film.

Polymeric tetrafluoroethylene because of its eminent heat resistance and stability, as well as solvent resistance, has been employed as electrical insulation for electrical conductors. The polymeric tetrafluoroethylene can be applied as a coating over bare copper electrical cores without any peeling or cracking of the polymeric insulation as a result of elevated temperatures to which the coated electrical conductor may be subjected. However, such insulated electrical conductors have the serious disadvantage that the abrasion resistance of such conductors is very low. Attempts to improve this abrasion by interposing, for instance, a thin coating, e. g., aluminum, or anodized aluminum, between the electrical core and the polymeric tetrafluoroethylene has resulted not only in no improvement in the abrasion resistance, but there has even been a decrease in the abrasion resistance. Finally, the use of polymeric tetrafluoroethylene for insulating electrical conductors has the further disadvantage that excessively high temperatures and long periods of time are required to apply the insulation over the conductor.

Polymeric chlorotrifluoroethylene can be more practically employed for insulation purposes because the temperatures required for coating electrical conductors is within a more practical temperature range as compared to temperatures required for coating electrical conductors with polymeric tetrafluoroethylene. The use of the former polymer is not accompanied by any sacrifice in the chemical resistance and heat stability of the insulation.

Unexpectedly it was found that when polymeric chlorotrifluoroethylene was applied as an insulation coating to bare copper electrical conductors, the insulation cracked and peeled from the electrical core when the insulated conductor was subjected to elevated temperatures. This was contrary to the results obtained when polymeric tetrafluoroethylene was employed as insulation.

We have now discovered that polymeric chlorotrifluoroethylene may be applied to metallic electrical cores as insulation without danger of cracking or peeling of insulation at elevated temperatures if the surface of the electrical core which is immediately in contact with the polymeric chlorotrifluoroethylene is an aluminum-type surface, more particularly, aluminum, aluminum oxide, or aluminum fluoride. Thus, we have prepared electrical conductors comprising a metallic core such as copper and an electrical insulation comprising polymeric chlorotrifluoroethylene by applying to the copper core a thin adherent continuous coating of, for instance, aluminum upon which the polymeric chlorotrifluoroethylene is placed. Instead of using a copper core with an aluminum coating between the core and the insulation we have employed with equivalent results a core consisting essentially of aluminum. Conductors so prepared have outstanding heat stability and flexibility and are not subject to the defects previously described.

Although other solid metallic cores, such as nickel, silver, etc., and copper cores plated with such metals as silver and nickel, have been insulated satisfactorily with polymeric chlorotrifluoroethylene, we have found that entirely unexpected and unobvious results have been obtained when the surface of the electrical core comprises either aluminum, or aluminum fluoride, or especially anodized aluminum (oxidized aluminum). Moreover, the improvement in abrasion resistance appears to be specific to polymeric chlorotrifluoroethylene, since the use in our claimed invention of an outer insulating sheath of a resinous material other than polymeric chlorotrifluoroethylene gives no improvement in abrasion resistance, and in some cases there is a decrease in abrasion resistance.

More particularly, we have discovered that when an aluminum, or anodized aluminum, or aluminum fluoride surface is directly in contact with the polymeric chlorotrifluoroethylene, there is obtained an insulated conductor whose abrasion resistance is outstandingly better than that obtained when the under-surface immediately adjacent the polymeric chlorotrifluoroethylene is any other metal which we have tried. In making this discovery, we have found that we may employ either solid aluminum electrical cores or metallic electrical cores having a coating of aluminum, anodized aluminum, or aluminum fluoride which is immediately adjacent to the polymeric chlorotrifluoroethylene insulation.

This discovery was entirely unobvious and unexpected in view of the fact that polymeric tetrafluoroethylene when employed as insulation in place of the polymeric chlorotrifluoroethylene yielded inferior results when an aluminum-type surface was directly in contact with the polymeric tetrafluoroethylene, and in view of the fact that other metals, such as silver, nickel and cadmium, when plated on copper cores to yield metallic surfaces directly in contact with the insulation, gave inferior abrasion resistance. The aluminum-type coating may, however, be superimposed over a thin metallic coating, e. g., cadium, nickel, iron, etc., which has previously been applied to the copper core and which is intermediate to and contacting directly the copper core and aluminum-type coating. This also applies to the use of the anodized aluminum coating and aluminum fluoride coating wherein the latter two coatings may be obtained by treatment and conversion of the outer surface of the aforementioned aluminum coating to the anodized form or to aluminum fluoride.

In accordance with one embodiment of our invention, we deposit a thin coating of polymeric chlorotrifluoroethylene on an aluminum electrial core by drawing the said aluminum core through a solution of polymeric chlorotrifluoroethylene, or preferably, through a liquid dispersion of the polymeric chlorotrifluoroethylene. Thereafter the coated conductor is passed through an oven maintained at an elevated temperature which assists in fusing the small particles of polymeric material to give a smooth continuous outer insulating sheath.

In another embodiment of our invention we deposit by suitable means a thin coating of aluminum over the metallic electrical core, for example, copper, etc., and thereafter pass it through the dispersion of polymeric chlorotrifluoroethylene as described above.

As will be apparent to those skilled in the art, any one of many methods may be employed to deposit the thin coating of aluminum over the metallic core. One method comprises forming a chemical complex of the aluminum in a non-aqueous medium and thereafter depositing the aluminum on the electrical core by electrochemical means. Another method comprises placing a thin aluminum sheath over the metallic core and passing the total assembly through a die whereby the aluminum is caused to adhere closely and tightly to the metallic core.

The thickness of the aluminum coating may be varied within wide limits depending upon the particular application and conditions required for the final electrical conductor. Thus, we may employ thickness of from 0.5 to 20 or more mils, preferably, from about 1 to 10 mils thickness. We do not intend to be limited in the scope of our invention to any particular thickness of aluminum since smaller or larger thicknesses of the aluminum coating may be employed without departing from the scope of our invention. As will be apparent, the aluminum coating may be treated to give either an anodized surface or aluminum fluoride surface, the latter two surfaces, preferably, though not necessarily, having thicknesses of the order of from 0.1 to 2.0 mils.

The thickness of the polymeric chlorotrifluoroethylene insulation may also be varied within wide ranges, for instances, from 0.5 to 10 mils. It is possible to coat the aluminum-type surfaced electrical conductor with thicker coatings of the insulation by repeatedly passing the conductor through the dispersion of the polymeric chlorotrifluoroethylene, preferably interspersing an oven bake at elevated temperatures between each pass through the dispersion. The number of passes required to deposit a certain thickness of polymeric chlorotrifluoroethylene will depend upon such factors as the concentration of the dispersion, the rate of travel of the electrical conductor, etc. All these factors may be varied depending upon the particular application for which the electrical conductor is intended.

In carrying out our invention, the polymeric chlorotrifluoroethylene is cut up into small pieces and run through a hammer mill to comminute it further into smaller particles. Thereafter the comminuted polymer powder is mixed with a dispersing liquid medium and put in a pebble mill and milled for a sufficient length of time until a homogeneous, fine dispersion results. The dispersion obtained in this manner is fairly stable and may be maintained in a homogeneous state by agitation.

In making the dispersion, any number of liquid organic dispersing media may be employed. Thus, we may use such organic liquids as high-flash naphtha, butyl alcohol, benzene, toluene, xylene, various glycols such as ethylene glycol, diethyl Cellosolve, etc. We have obtained good results by employing a liquid dispersing medium comprising, by weight, two parts high-flash naphtha and one part n-butyl alcohol.

The proportion of finely divided polymeric chlorotrifluoroethylene to the liquid dispersing medium may be varied within wide limits without departing from the scope of the invention. For example, we may employ, by weight, from 60 to 95 parts of the liquid dispersing medium to from 5 to 25 parts of the polymeric chlorotrifluoroethylene. Larger or smaller ratios of polymer and dispersing medium may also be used.

The manner in which the metallic core is passed through the dispersion of the polymeric chlorotrifluoroethylene may be varied within wide limits. One method comprises passing the electrical conductor through the dispersion and thereafter into an oven at a speed of, for example, from 5 to 15 feet per minute, depending, for instance, on the length of the oven, the wire size, and the temperature maintained in the oven. It is desirable that the entrance end of the oven be at a temperature of around 100° to 200° C. to volatilize the liquid dispersing phase, and that the temperature near the exit end of the oven be maintained at about 400° to 600° C. where fusion of the particles of polymeric chlorotrifluoroethylene takes place to give the continuous, homogeneous, smooth coating or film. In order to obtain a thicker coating of the insulation, as the coated conductor comes from the exit end of the oven it can be passed through the dispersion again and then directed through the oven once more. As pointed out above, this cycle of passage through the dispersion and through the oven may be repeated any number of times desired to obtain the requisite coating thickness.

In order that those skilled in the art may better understand how the instant invention may be practiced, the following examples are given by way of illustration and not by way of limitation. All parts are by weight.

*Example 1.—Preparation of dispersion*

Polymeric chlorotrifluoroethylene was run through a hammer mill until a finely comminuted powder was obtained. About 15 parts of the polymer powder was mixed with 85 parts of a liquid dispersing medium, two-thirds of which, by weight, was high-flash naphtha and one-third n-butyl alcohol. This mixture was thereafter placed in a pebble mill and milled for about 168 hours.

*Example 2.—Treatment of electrical conductors*

Various electrical conductor cores in the form of wire and free of outer insulation were passed through the liquid dispersion of the polymeric chlorotrifluoroethylene at the rate of about 8 to 10 feet per minute, and thereafter the coated conductor was led into an oven whose temperature at the entrance end was about 150° C. and at the exit end about 500° C. In each case the conductor was led into the dispersion and oven several times until an approximately two mils thickness of polymeric chlorotrifluoroethylene was obtained. Each of the insulated conductors was of the order of from about 32 to 39 mils in diameter.

One of the electrical conductors coated in the manner described above was a solid aluminum wire of about 32 mils diameter which was coated with a two mil thickness of polymeric chlorotrifluorethylene by passing the conductor eight times through the polymer dispersion and the oven to give an insulated conductor having a total diameter of 36 mils.

Another conductor coated as described above comprised copper wire of about 25 mils diameter which was passed through molten aluminum and thereafter through a die to give a 5 mil thick aluminum sheath on the copper core. The copper wire was first cleaned in a strong alkali solution such as an aqueous sodium hydroxide solution, and later in a sulfuric acid solution to give a bright, shiny, copper surface free of oxide, and thereafter washed with water to remove all traces of acid. While drawing the copper core through the molten aluminum, the aluminum bath was blanketed with an atmosphere comprising nitrogen containing a small amount of hydrogen to prevent oxidation of the copper.

An additional insulated electrical conductor was prepared by anodizing an aluminum-plated copper core by passing it through an anodizing medium such as a solution of oxalic acid, chromic acid, sulfuric acid, caustic (NaOH), etc., suitably arranged to make the conductor the anode in the anodizing bath. Such treatment resulted in the formation of an oxide coating on the aluminum. This particular electrical conductor was also coated with the polymeric chlorotrifluoroethylene by passing the conductor through a dispersion of the resin in the manner described previously.

Another electrical conductor was prepared by passing aluminum wire through a 10 per cent aqueous hydrogen fluoride solution and drying the wire. This resulted in an aluminum surface having a film of aluminum fluoride thereon.

Other electrical conductors were coated with an insulation of polymeric chlorotrifluoroethylene as described above. These comprised solid nickel wire, nickel-plated copper wire, chromium-plated copper wire, zinc-plated copper wire, iron wire, cadmium-plated copper wire, lead-plated copper wire, tin-plated copper wire, silver-plated copper wire, and plain copper wire.

Example 3.—Testing of coated electrical conductors

Each of the coated, i. e., insulated, electrical conductors prepared as in Example 2 was tested for heat-aging, flexibility, and abrasion resistance. The abrasion resistance test on each insulated conductor was conducted as follows:

A round steel needle, about 18 mils in diameter, was placed perpendicular to each conductor being tested and was set into a reciprocating motion against the surface of the insulation while applying a weight against the needle. A voltage was applied between the needle and the electrical conductor so that when the insulation was broken through, a short developed which stopped the scraping action and shut off the apparatus recording the number of scrapes. A more complete description of this apparatus may be found in the General Electric Review, volume 45, page 285 (1942), published by the General Electric Company at Schenectady, New York.

The heat-aging and flexibility tests on the solid conductors were carried out by placing the insulated conductors in an oven maintained at an elevated temperature for a certain period of time. At the end of this time the conductor was removed and the insulation was examined to determine if there had been any color change. In addition, each heat-aged conductor was bent around a mandrel of small diameter to determine the flexibility of the insulation after heat-aging and to establish the minimum diameter around which the insulated conductor could be bent without developing cracks or peeling of the insulation.

The copper wire containing no metallic coating between the copper core and the insulation exhibited cracking when bent on approximately its own diameter (a 32 mil diameter) after heat-aging for 24 hours at 175° C. or when heat-aged at 150° C. for 65 hours. The test for abrasion resistance showed that the insulation was broken through after an average of about five strokes of the steel needle. Finally, the tan color of the copper wire prior to heat-aging had turned to dark brown indicating decomposition of the insulation.

The insulated solid aluminum electrical conductor did not show any evidence of cracking when it was bent arount a 32 mil diameter after being heat-aged at 200° C. for 165 hours or 250° C. for 24 hours. In addition, the color of the insulation had not changed during the heat-aging process. The abrasion resistance test of this insulated conductor showed that 24 strokes of the steel needle were required before the insulation was broken through. Essentially the same results were obtained in the case of the electrical conductor comprising the copper core containing an outer surface of aluminum superimposed between the copper and the polymeric chlorotrifluoroethylene insulation, and in the case of the aluminum wire having the aluminum fluoride surface.

With regard to the electrical conductor comprising a copper core and having the anodized aluminum surface between the copper core and the polymeric chlorotrifluoroethylene insulation, it was found that this conductor was as heat resistant as the two aforementioned electrical conductors comprising solid aluminum and aluminum over the copper core. However, it was most unexpected to find that the abrasion resistance of the electrical conductor containing the anodized aluminum surface was the highest of any tested. Thus, it was found that about 100 strokes of the steel needle were required before the conductor failed.

With regard to the other insulated electrical conductors tested, it was found that in the abrasion resistance test only from 1 to 8 strokes of the steel needle were required before the insulation was broken through. In no case did the abrasion resistance approach that of the electrical conductors containing an aluminum-type surface directly in contact with the polymeric chlorotrifluoroethylene insulation. With the exception of the insulated nickel wire and steel wire, all the other insulated electrical conductors cracked when wound on a 32 mil diameter after heat-aging at 250° C. for 24 hours. In addition, all those which cracked in the flexibility test also exhibited a marked change in color from the original color of the insulation after the heat-aging step due to decomposition of the insulation.

By means of our invention, electrical apparatus containing copper conductors of the type disclosed and claimed herein, as well as solid aluminum conductors, may be run at higher temperatures than heretofore was possible without danger of having the insulation material cracking or peeling with subsequent short circuiting or damage to the electrical apparatus. In addition, electrical apparatus containing the claimed conductors may be operated for longer periods of time at elevated temperatures without danger of a breakdown of the insulation coating. Moreover, being able to use polymeric chlorotrifluoroethylene as insulation for electrical conductors now opens the field for the use of such conductors in corrosive and deleterious atmospheres which will not affect the aforementioned polymeric insulation. Finally, because of the increased abrasion resistance of insulated electrical conductors produced in accordance with our invention, it is now possible to wind various types of electrical apparatus with such conductors employing faster winding rates, whereas previously it was necessary to wind slowly and exercise great care due to the low abrasion resistance of previously obtained insulated electrical conductors.

It will, of course, be apparent to those skilled in the art that in place of the copper core employed in the preceding examples other metallic cores may be employed as, for instance, nickel, silver, ferrous metals, etc. Each of these cores may be coated or plated, as pointed out previously, with a thin adherent coating of aluminum, or aluminum oxide (obtained, for instance, by oxidizing the aluminum surface), or aluminum fluoride (obtained, for instance, by treating the aluminum surface with HF), prior to insulation with the polymeric chlorotrifluoroethylene. The surface of the aluminum may also be anodized or treated to yield an aluminum fluoride surface as described above.

What we claim as new and desire to secure by Letters Patent of the United states is:

1. An electrical conductor of improved abrasion resistance consisting essentially of (1) a core of copper having an outer surface of anodized aluminum and (2) an outer sheath comprising essentially polymeric chlorotrifluoroethylene superimposed on said core and in direct contact with the anodized aluminum surface.

2. An electrical conductor of improved abrasion resistance consisting essentially of (1) a metallic core having an outer coating of aluminum, the outer surface of said aluminum being anodized, and (2) an outer insulating sheath comprising essentially polymeric chlorotrifluoroethylene superimposed directly upon and in contact with said anodized aluminum surface.

3. The process of preparing an electrical conductor insulated with polymeric chlorotrifluoroethylene in which the aforesaid insulation has good heat adhesion and abrasion resistance, which process consists essentially of (1) applying a thin coating of aluminum to a copper core, (2) anodizing the surface of the aluminum coating, and (3) applying an outer insulating sheath of polymeric chlorotrifluoroethylene directly to the anodized aluminum surface.

References Cited in the file of this patent

UNITED STATES PATENTS

| | | |
|---|---|---|
| 723,717 | Nicholson | Mar. 24, 1903 |
| 1,637,033 | Basch | July 26, 1927 |
| 1,842,970 | Hovey | Jan. 26, 1932 |
| 1,923,539 | Jenny | Aug. 22, 1933 |
| 2,216,234 | Emig | Oct. 1, 1940 |
| 2,393,967 | Brubaker | Feb. 5, 1946 |
| 2,485,691 | Bogese | Oct. 25, 1949 |
| 2,497,046 | Kropa | Feb. 7, 1950 |

FOREIGN PATENTS

| | | |
|---|---|---|
| 23,007 | Great Britain | 1908 |
| 302,202 | Great Britain | Dec. 12, 1928 |
| 445,682 | Great Britain | Apr. 16, 1936 |